United States Patent [19]

Appel

[11] Patent Number: 5,381,259
[45] Date of Patent: Jan. 10, 1995

[54] RASTER OUTPUT SCANNER (ROS) USING AN OVERFILLED POLYGON DESIGN WITH MINIMIZED OPTICAL PATH LENGTH

[75] Inventor: James J. Appel, Rochester, N.Y.
[73] Assignee: Xerox Corporation, Stamford, Conn.
[21] Appl. No.: 136,068
[22] Filed: Oct. 14, 1993
[51] Int. Cl.⁶ .............................. G02B 26/08
[52] U.S. Cl. ................... 359/216; 359/217; 359/218; 250/236
[58] Field of Search .......... 359/212, 216–220, 359/710; 250/234–236; 346/108; 358/474, 494

[56] References Cited

U.S. PATENT DOCUMENTS

| | | | |
|---|---|---|---|
| 3,944,323 | 3/1976 | Starkweather | 359/216 |
| 4,941,721 | 7/1990 | Banton et al. | 359/217 |
| 4,978,184 | 12/1990 | Straayer | 359/216 |
| 5,052,767 | 10/1991 | Sugata et al. | 359/216 |
| 5,270,849 | 12/1993 | Bock et al. | 359/216 |

Primary Examiner—Loha Ben
Assistant Examiner—James Phan

[57] ABSTRACT

In an overfilled ROS polygon system, the total optical path length is minimized by focusing modulated laser beams onto the polygon facets in the cross scan direction by placing a single cylindrical lens between the laser diode and a collimator lens. The combined cross scan power of the cylinder lens and the collimator lens provides the cross scan focusing at the required high magnification.

3 Claims, 2 Drawing Sheets

RASTER OUTPUT SCANNER (ROS) USING AN OVERFILLED POLYGON DESIGN WITH MINIMIZED OPTICAL PATH LENGTH

The invention relates to a raster output scanning (ROS) system used in an overfilled polygon facet architecture and, more particularly, to an improved optical system for such an architecture with a minimized prepolygon optical path length.

Digital printers incorporating raster output scanners use a rotating polygon as the scanning element to form modulated scan lines on the surface of a photosensitive medium. In a typical system, a beam, modulated according to an input video signal, is emitted from a light source such as a helium neon or a diode laser. The modulated light is directed through pre-polygon conditioning optics, onto the facets of a rotating polygon. The polygon rotates in the 3 to 30 krpm range, then scans the beam through a post-polygon optical system and images the laser spot as a scan line across the full process width of a photosensitive medium moving in a process direction. In prior ROS systems there are typically two scanning modes. In a first mode, pre-polygon conditioning optics incorporate an underfilled design; e.g. the light from the laser is either collimated, in the case of a diode laser, or expanded in the case of a gas laser, and collimated to the correct beam width in the fast scan direction on an imaging polygon facet that is larger than the beam width, typically by a factor of approximately 3. The underfilled design has been generally preferred because of a high throughput efficiency and uniform illumination of the imaging facet. A second mode is the overfilled design where the light beam is collimated (laser diode) or expanded (gas laser) to a beam width in the fast scan direction on an imaging polygon facet that is smaller than the beam width by a factor of 3 or so in the fast scan direction. In an overfilled design the requirement for facet size required to produce a given spot size at the image medium is greatly reduced allowing many more facets to be accommodated on the same diameter polygon. This, in turn, permits the scan system to form more scan lines per second with a given polygon motor, or, alternatively, to permit the use of less powerful and less expensive polygon motor drives. The overfilled design has several disadvantages which have heretofore not been completely resolved. The throughput efficiency is relatively low (20%), compared to the 50% efficiency of the underfilled design, and the illumination of the imaging facet is not as uniform as the underfilled design. This illumination problem, however, has been addressed by the techniques disclosed in U.S. Pat. No. 4,941,721.

The overfilled design, in addition to the disadvantages mentioned above, has a further disadvantage in that the overfilled polygon ROS design requires a relatively long optical path which places constraints on the overall size of the ROS housing, the number of fold mirrors and the sensitivity to vibration and alignment errors. The main causes for the longer optical path is the requirement, in the overfilled design, for a relatively long pre-polygon path to obtain the required magnification for imaging the spot at the facet surface. This is demonstrated with reference to a prior art design shown in FIG. 1.

Referring to FIG. 1, there is shown a prior art ROS system 8, having an overfilled polygon facet design. A laser diode 12 serves as the source of high intensity, polarized radiation. The laser diode 12 is self-modulating and the output beam of light is modulated in conformance with the information contained in a video signal from an Electronic Sub-System (ESS) 10. The modulated beam is collimated by collimator assembly 14. The collimated light bundle has a width in the scan direction, which will overfill facets 24A and 24B. Rays 22a and b represent this overfilled image beam. Rays 22a and b pass through cylinder lens assembly 20. Lens assembly 20 is a two element telephoto lens. Diode 12, collimator 14 and lens assembly 20 form a pre-polygon optical system. The cylinder lens assembly creates a focused beam at the polygon facet, at some required magnification in the cross scan axis of the polygon while maintaining the collimation of the beam in the perpendicular or scanning axis. The focused, collimated light beam is incident across facets 24A, 24B of polygon 24, being rotated by a polygon motor 26. Facet 24A is shown for illustrative purposes as the imaging facet, while facet 24B is an adjacent facet. As the polygon rotates, light reflected from facet 24A is scanned through a post-polygon f-Θ lens assembly 30. Post-polygon f-Θ lens assembly 30 is designed to provide a linear relationship between the rotation of polygon 24 and the deflection of the scanned beam in the scan direction at the surface of photoreceptor 32. The photoreceptor 32 moves in a process direction. Post-polygon f-Θ lens assembly 30 consists of one or more elements which focus the collimated reflected light in the fast scan direction onto the image plane, and re-images the light focused on the facet in the cross scan direction, onto the image plane to provide wobble correction. A cylinder mirror may follow the post polygon f-Θ lens assembly or a toroidal surface, may be included in the post polygon f-Θ lens assembly to provide wobble correction. The reflected rays from polygon 24 are thus focused in both the fast (scan) and slow (cross) scan direction of photoreceptor 32 by the post polygon f-Θ lens assembly with a toroidal surface, or by the post polygon f-Θ lens assembly and a cylinder mirror.

For this type of prior art system, generally disclosed in U.S. Pat. No. 4,941,721, the optical path length between laser 12 and polygon 24 (pre-polygon path length L) is forced by the beam focusing requirements to be over 200 mm long, increasing the cost and complexity of the ROS. As an example, for 600 spot/inch (spi) resolution at the photoreceptor 32, and a 42 $\mu$m cross scan spot size (FWHM), for a typical laser diode 12, the diode to photoreceptor cross scan magnification must be set at approximately 6× enlargement while the facet to photoreceptor path must be designed to work at a reduction of about 0.3× in the same cross scan plane. Thus, the pre-polygon path must work at a relatively large magnification in the cross scan plane of about 18×. At this 18× magnification, the focal length of the cylinder lens assembly 20 must be approximately 18 times the focal length of collimator assembly 14. The collimator focal length, in turn, is constrained in an overfilled system, by the need to be relatively large, 40 mm being the norm in the prior art, in order to allow sufficient beam expansion in the fast scan plane to overfill the polygon facets. With a 40 mm collimator focal length and an 18× diode to facet cross magnification requirement, the pre-polygon cylinder assembly focal length would be 720 mm. If a single cylindrical element were used, these constraints would cause the pre-polygon path length to be approximately 760 mm long. This long pre-polygon path makes it difficult to fit such a ROS into a xerographic engine and makes such a ROS sensitive to vibrations. The use of the two element telephoto cylinder lens assembly 20 brings the total path length down to 215 mm but adds the additional expense of a second cylindrical lens element.

It would be desirable to reduce the optical path length even further while eliminating the need for a costly and complex two element telephoto type lens. This objective is realized, according to the present invention, by using a single cylinder lens, with power in the cross scan plane only, positioned between the laser diode and the collimating lens. At this position, the cylinder lens can have a very short focal length. The power of the cylinder lens combined with the cross scan power of the collimating lens provides the required, relatively high, diode to facet magnification in the cross scan plane without the need for a more expensive two element telephoto cylinder lens pair, or a long pre-polygon path length. More particularly, a raster output scanner (ROS) imaging system comprising:

a light source for generating a coherent light beam output along an optical path, a photosensitive image plane, a rotatable multifaceted polygon interposed in the optical path between the light source and the photosensitive image plane for scanning light beams directed onto the facets of said polygon in a fast scan and cross scan direction across the photosensitive image plane, said light beams directed against the rotating polygon completely illuminating each facet and a portion of adjacent facets, a post polygon optical system to focus reflected light beams from said polygon in said fast scan and cross scan directions, and a pre-polygon optical system including a collimator leas positioned in the optical path between said light source and said polygon, and a cylindrical lens positioned between said light source and said collimator lens, said cylindrical lens having power only in the cross scan direction, said cylindrical lens and collimator lens creating a focused beam in the cross scan direction at the polygon facet surface while maintaining the collimation of the beams in the scan direction.

DESCRIPTION OF THE INVENTION

Figure 1:
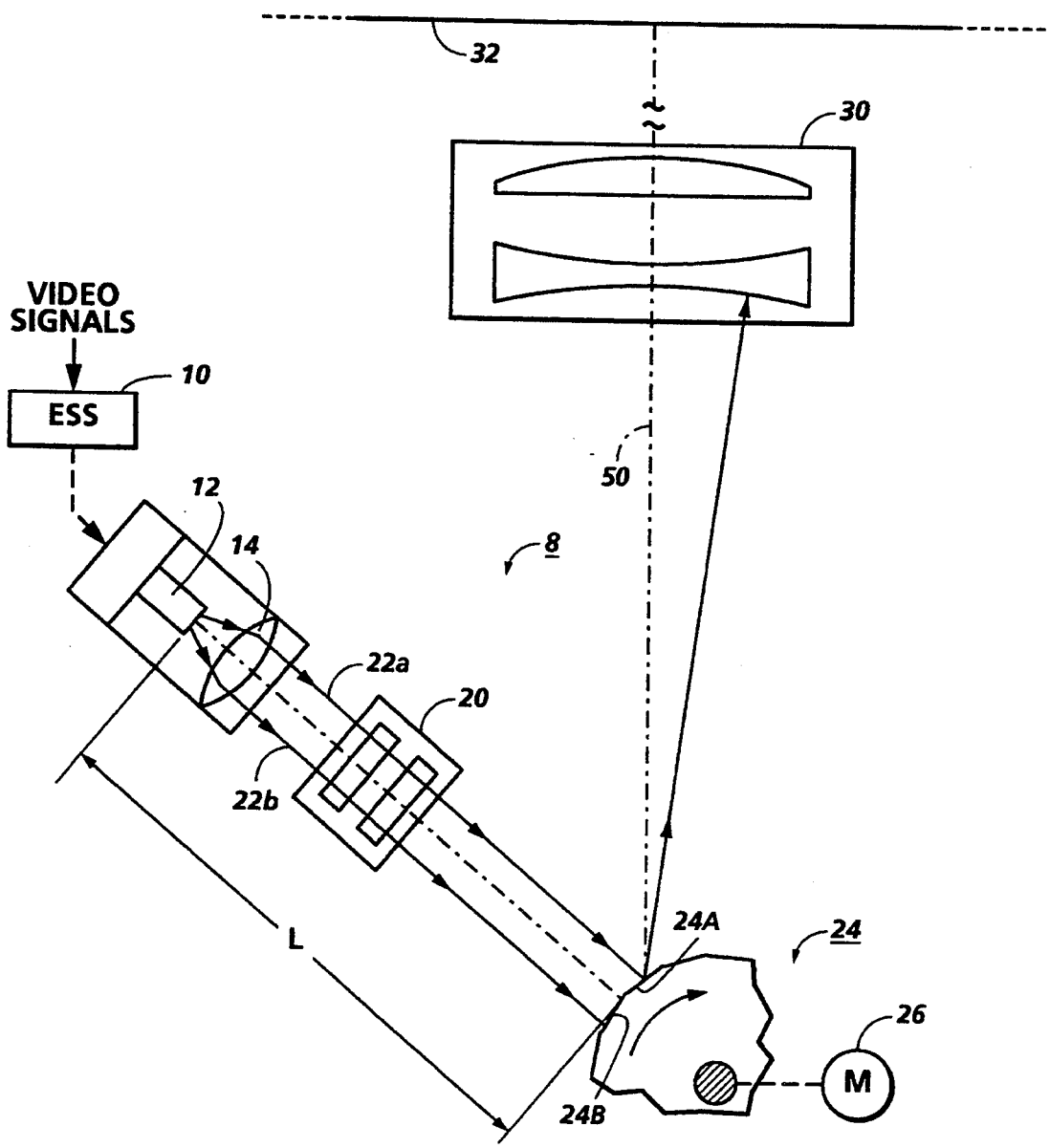
FIG. 1 shows a prior art overfilled polygon ROS design from a top (cross scan) perspective.
Figure 2:
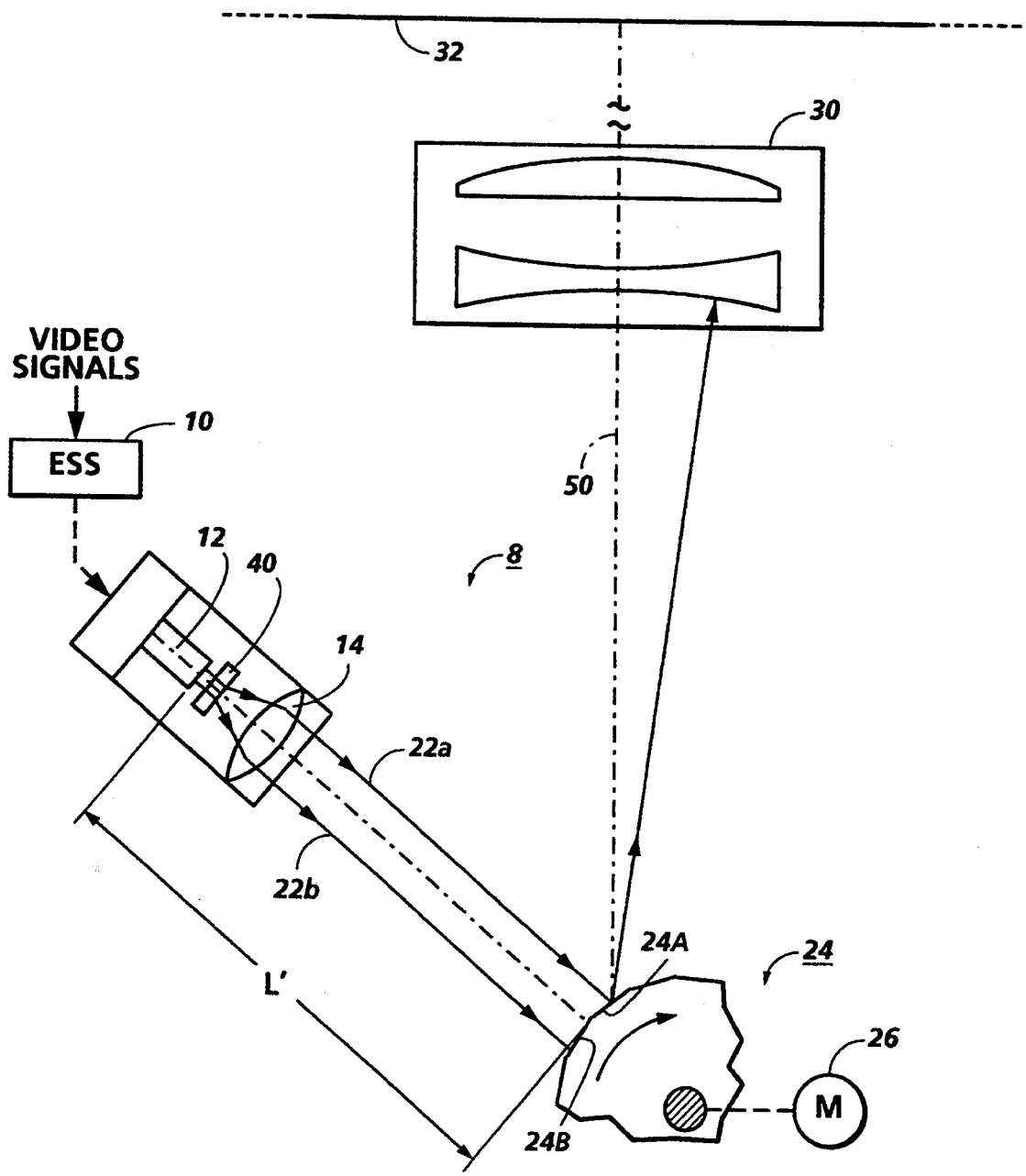
FIG. 2 shows the design of FIG. 1 with the cylindrical lens of the present invention located in the pre-polygon optical system between the diode laser and the collimator.

FIG. 2 shows the prior art scanning system of FIG. 1 (top view, cross scan perspective) modified by introducing a cylinder lens 40 between the collimator lens 14 and the diode 12, resulting in a shortening of the pre-polygon optical length by about 10%. Lens 40, in a preferred embodiment has a focal length of 7.4 mm and a surface shape which can be either cylindrical or a-cylindrical but with power only in the cross scan plane. Collimator lens 14 is a 30 mm diameter, 40 mm focal length, rotationally symmetric aspheric lens. The power of lens 40 is combined with the power of collimator lens 14 to image beams 22a, 22b on facets 24a, 24b at the required 18× magnification in the cross scan plane. Collimator lens 14 collimates the light in the scan plane and creates the required fast scan beam diameter of 30 mm at the facets. The diode to facet distance L' is (m +1)×f=19×f, where f is the focal length in the cross scan plane of the combination of the cylindrical lens 40 and the collimator lens 14. For f=10.66 mm, the diode-to-facet distance L' would be 192 mm, shorter almost 10% than the FIG. 1 embodiment. In addition, since lens 40 is only a single element instead of the two required in the telephoto design of FIG. 1, the cost of the optical components for this overfilled system is reduced.

While the embodiment disclosed herein is preferred, it will be appreciated from this teaching that various alternative, modifications, variations or improvements therein may be made by those skilled in the art, which are intended to be encompassed by the following claims:

I claim:

1. A raster output scanner (ROS) imaging system comprising:

a light source for generating a coherent light beam output along an optical path, a photosensitive image plane, a rotatable multifaceted polygon interposed in the optical path between the light source and the photosensitive image plane for scanning light beams directed onto the facets of said polygon in a fast scan and cross scan direction across the photosensitive image plane, said light beams directed against the rotating polygon completely illuminating each facet and a portion of adjacent facets, a post polygon optical system to focus reflected light beams from said polygon in said fast scan and cross scan directions, and a pre-polygon optical system including a collimator lens positioned in the optical path between said light source and said polygon, and a cylindrical lens positioned between said light source and said collimator lens, said cylindrical lens having power only in the cross scan direction, said cylindrical lens and collimator lens creating a focus beam in the cross scan direction at the polygon facet surface while maintaining the collimation of the beam in the scan direction.

2. The imaging system of claim 1 wherein said cylindrical lens has a focal length equal to or greater than 7.4 mm.

3. The imaging system of claim 2 wherein an optical path L', defined as the distance between the light source and the polygon, is equal to or greater than 192 mm.

* * * * *